UNITED STATES PATENT OFFICE.

CHAUNCEY C. LOOMIS, OF SYRACUSE, NEW YORK, ASSIGNOR TO SEMET-SOLVAY COMPANY, OF SOLVAY, NEW YORK, A CORPORATION OF NEW YORK.

ART OF HALOGENATING HYDROCARBON COMPOUNDS.

1,384,909. Specification of Letters Patent. Patented July 19, 1921.

No Drawing. Application filed November 8, 1917. Serial No. 200,871.

*To all whom it may concern:*

Be it known that I, CHAUNCEY C. LOOMIS, a citizen of the United States, residing at Syracuse, in the county of Onondaga and State of New York, have invented certain new and useful Improvements in the Art of Halogenating Hydrocarbon Compounds, of which the following is a specification.

In effecting the halogenation of a hydrocarbon compound, such as toluene and its homologues and substitution products, with chlorin or bromin, by the process heretofore generally practised for the introduction of the halogen into the side-chain; e. g., for the production of benzyl chlorid, the halogen is passed into the hydrocarbon when the latter is at its boiling temperature or into the vapor of the boiling hydrocarbon, and the reaction is customarily carried out either in a strong light or in the presence of some catalyst such as sulfur or phosphorus.

In all its modifications this process presents certain disadvantages. Among these are the necessity of effecting the reaction at the boiling point of the hydrocarbon and the consequent carrying away of a portion of the hydrocarbon by the acid gas evolved, in a form difficult to recover. Also because of the exceedingly corrosive action of the nascent acid (hydrochloric or hydrobromic as the case may be) evolved, it is extremely difficult to design durable apparatus and moreover if any iron, antimony, or other nuclear halogenating catalyst is present, a large amount of nuclear halogenation, as distinguished from side-chain halogenation will take place giving rise to undesirable compounds which will be present as impurities in the desired product and are extremely difficult to separate therefrom. Under the best of conditions the reaction is slow and a considerable quantity of more or less complex nuclear halogenated products are obtained.

The object of my improvements is to obviate these difficulties and my invention broadly stated consists in the application of the fact which I have discovered that if the halogen be admitted to the hydrocarbon while the latter holds in suspension an alkali-metal carbonate, not only is the reaction more rapid than heretofore but it can be effected at lower temperatures and through a wider range of temperature and in the absence of light and in the presence of nuclear catalysts, as iron. The corrosive action is also done away with and the formation of nuclear halogenated products is reduced to a minimum, that is, a preferential or selective halogenation takes place with resulting introduction of the halogen into the side-chain, and with the production of only relatively small amounts of compounds containing halogen introduced into the nucleus. The process of the present invention is therefore a process of effecting a selective or preferential halogenation in the side-chain, with resulting production of compounds such as benzyl chlorid, benzal chlorid, and benzotrichlorid, and with the production of only small amounts of nuclear chlorination products such as chlortoluene.

The invention will be understood by describing in detail a typical application of it, as to the chlorination of toluene, using commercial sodium carbonate as the neutralizing agent. In this case 75 parts of the sodium carbonate are mixed with 150 parts of toluene and kept in suspension by vigorous stirring. A rapid current of chlorin gas is then passed into the mixture and it will be found that the yellow chlorin color of the entering gas is rapidly bleached. The temperature rises quite rapidly from the heat of reaction. The mixture can be held at any temperature up to its boiling point without making a very great difference in the result, but I have found that the minimum of nuclear chlorination is obtained at intermediate temperatures. I have found that satisfactory results are obtained between 60°—70° C. When the sodium carbonate has been nearly all used up the mixture becomes thick and hard to stir. The chlorin is then shut off, the NaCl and NoHCO$_3$ formed are dissolved out with water and the water and oil are separated. The oil consists of a mixture of benzyl chlorid and toluene and will be found to have a specific gravity of from 1.02 to 1.05 at 20° C., or somewhat less than that of pure benzyl chlorid. This can, if desired, be mixed with sodium carbonate and again chlorinated in the same manner as before, with production of benzal chlorid and benzotrichlorid.

The process is applied in the same manner to the bromination of toluene (the bromin if desired being admitted to the mixture in the liquid form) and also the chlorination and bromination of the homologues of toluene, as xylene, and their substitution products (except those in which the substituted group is effected by the halogen and excepting also certain ortho substituted derivatives as e. g. ortho-nitro toluene), the corresponding compound being formed in each case.

Though in the typical illustration given above, I have mentioned sodium carbonate as the agent to be used with the halogen in effecting the selective or preferential halogenation of the side-chain, my invention is not limitd to the use of this, but I may employ other suitable alkali-metal carbonate.

While I do not wish to limit myself to any theoretical explanation of the reaction which takes place, and which results in the preferential or selective chlorination of the side-chain, nevertheless I believe that the sodium carbonate acts in part to neutralize the acid set free by the chlorination and in part reacts to form sodium hypochlorite and carbon dioxid, with subsequent reaction of the carbon dioxid or carbonic acid and hypochlorite to form hypochlorous acid which effects or promotes the side-chain chlorination.

Having thus described my invention, what I claim as new and desire to secure by Letters Patent is:

1. The improvement in the art of halogenating toluene and its homologues and substitution products in the side-chain, which comprises subjecting the same to the action of a halogen in the presence of an alkali-metal carbonate.

2. The improvement in the art of chlorinating toluene and its homologues and substitution products in the side-chain, which comprises subjecting the same to the action of chlorin in the presence of an alkali-metal carbonate.

3. The improvement in the art of halogenating toluene and its homologues and substitution products which consists in mixing sodium carbonate with the hydrocarbon and admitting the halogen to the mixture.

4. The improvement in the art of halogenating toluene and its homologues and substitution products which consists in mixing sodium carbonate with the hydrocarbon and admitting the halogen to the mixture while maintaining the sodium carbonate in suspension in the hydrocarbon.

5. The improvement in the art of chlorinating toluene for the production of benzyl chlorid, which comprises subjecting the toluene to the action of chlorin in the presence of an alkali-metal carbonate.

6. The improvement in the art of chlorinating toluene for the production of benzyl chlorid, which comprises subjecting the toluene to the action of chlorin in the presence of an alkali-metal carbonate and dissolving out the alkali-metal salts from the chlorination product with water.

In testimony whereof I have affixed my signature this 2nd day of November, 1917.

CHAUNCEY C. LOOMIS.